(12) United States Patent
Küpper

(10) Patent No.: US 11,607,609 B2
(45) Date of Patent: Mar. 21, 2023

(54) CONTROL CONSOLE

(71) Applicant: Snakebyte Technologies, Ltd., Hong Kong (CN)

(72) Inventor: Marc Küpper, Hong Kong (CN)

(73) Assignee: SNAKEBYTE TECHNOLOGIES, LTD., Kowloon (HK)

( * ) Notice: Subject to any disclaimer, the term of this patent is extended or adjusted under 35 U.S.C. 154(b) by 0 days.

(21) Appl. No.: 16/972,871

(22) PCT Filed: Jun. 8, 2018

(86) PCT No.: PCT/EP2018/065135
§ 371 (c)(1),
(2) Date: Dec. 7, 2020

(87) PCT Pub. No.: WO2019/233594
PCT Pub. Date: Dec. 12, 2019

(65) Prior Publication Data
US 2021/0245042 A1 Aug. 12, 2021

(51) Int. Cl.
*A63F 13/24* (2014.01)
(52) U.S. Cl.
CPC .................................... *A63F 13/24* (2014.09)
(58) Field of Classification Search
None
See application file for complete search history.

(56) References Cited

U.S. PATENT DOCUMENTS

| 5,624,117 A | 4/1997 | Ohkubo et al. |
| 2007/0057974 A1* | 3/2007 | Woodson ................ A63F 13/06 345/684 |
| 2017/0001109 A1 | 1/2017 | Dornbusch et al. |
| 2017/0354895 A1* | 12/2017 | Dornbusch ............. A63F 13/23 |
| 2019/0118080 A1* | 4/2019 | Campbell ............... A63F 13/24 |

FOREIGN PATENT DOCUMENTS

| GB | 2210145 A | 6/1989 |
| WO | 2014187923 A1 | 11/2014 |

OTHER PUBLICATIONS

International Search Report (ISR) dated Feb. 12, 2019 in parent international application PCT/EP2018/065135.
Written Opinion (WO) of the International Searching Authority (ISA) dated Feb. 12, 2019 in parent international application PCT/EP2018/065135.
International Preliminary Report on Patentability (IPRP) Chapter II dated Oct. 8, 2020 in parent international application PCT/EP2018/065135.

* cited by examiner

*Primary Examiner* — Peter J Iannuzzi
(74) *Attorney, Agent, or Firm* — Polson Intellectual Property Law, PC; Margaret Polson; Christopher Sylvain

(57) ABSTRACT

A control console having a front side and a rear side, with multiple manually operated control elements being arranged on the front side of the control console. The control console comprises at least one additional control element, which is configurable in respect of the functionality thereof. In order to configure the additional control element, the control console comprises a function selection module having at least one pre-programmed control element functionality and having a manually operated function selector switch for selecting a pre-programmed control element functionality as a functionality which can be carried out by the additional control element.

20 Claims, 2 Drawing Sheets

CONTROL CONSOLE

BACKGROUND

The present disclosure relates to a control console having a front side and a rear side, with multiple manually operated control elements being arranged on the front side of the control console, the control console comprising at least one additional control element, which is configurable in respect of the functionality thereof.

Control consoles are required as input devices for playing computer games. Computer games have become more and more complex, so that the required control consoles also have a plurality of control elements to be able to control the various required functions of a game avatar, which may be a character, a device or the like, in a game. Modern control consoles are designed ergonomically to be held in both hands and typically have two gripping shoulders spaced apart from each other, the gripping shoulders sometimes being slightly sloped towards each other facing away from the operator side. The front side of the control console, representing the top thereof in the viewing direction of a user, holds the control elements. Typically, such a control console has two joysticks arranged such that one joystick can be operated with the fingers of one hand and the other joystick can be operated with the fingers of the other hand. Further, such a control console has push-buttons which may also be designed as a single or cross rocker. Such a control console sometimes also has a display which may show information about the game and/or the persons involved to the user of the control console. Such control consoles are also commonly referred to as controllers in the United States.

Many computer games require very precise maneuvering of the game avatar. Navigation is done using the joystick(s) which may typically be operated by the thumb, also to perform rotary movements and push operations. The index fingers are used to operate control elements present on the front side wall of the control console. The other control elements on the front side of the control console, typically buttons, can only be operated when taking the thumb off the joystick. One of the two joysticks is typically used to maneuver the game avatar. The other joystick influences the camera position. Therefore, removing the thumb from the joystick to operate one of the other control elements can compromise navigation of the game avatar or compromise the camera movement actually desired. For this reason, control consoles have been developed which have two or more additional control elements on their rear side. These additional control elements are configurable in respect of the functionality to be performed by this control element, i.e., with the functionality of a control element present on the front side. In this way, the functionality of a control element arranged on the front side, for example a push-button, can be allocated to an additional control element present on the rear side such that the functionality otherwise only able to be performed on the front side is now possible on the rear side by operating the additional control element with a finger not required for operating a joystick. For programming these additional control elements, such a prior-art control console has an interface for connecting the control console to an external programming unit, for example a computer, using which the programming of the additional control element(s) is carried out. According to another prior-art design, such programming is contact-less by switching the control console into a configuration mode with an external additional device and then configuring the control functionality for the additional control element(s).

However, these prior-art control consoles have the disadvantage that the programming or configuration of the additional control elements is sometimes complex and, once programming has been done, cannot be changed without additional devices.

SUMMARY

Proceeding from this background, an aspect of the present disclosure is to further develop a control console of the type mentioned at the beginning such that programming of the additional control element(s) can be carried out without additional devices and, if required, also during the game or while briefly interrupting the game.

This is achieved by the generic control console mentioned at the beginning, in which, in order to configure the additional control element, the control console comprises a function selection module having at least one pre-programmed control element functionality and having a manually operable function selector switch for selecting a pre-programmed control element functionality as a functionality which can be carried out by the additional control element.

This control console for an electronic game (computer game) has a function selection module by which at least one pre-programmed control functionality can be selected to assign this control functionality to at least one additional control element. Typically, such a function selection module has multiple pre-programmed control element functionalities. The selection of the control functionality to be assigned to an additional control element is carried out with a manually operable function selector switch. Typically, different switching positions of the function selector switch are allocated different pre-programmed control functionalities, so that the switching position of the function selector switch can be used to allocate the desired pre-programmed control element functionality to the additional control element. As the control element functionalities able to be assigned to such an additional control element are pre-programmed, external components or devices are not required for this control console to be able to allocate a pre-determined or pre-programmed control element functionality to the at least one additional control element. To do so, the function selector switch only needs to be adjusted, by adjusting the same to the position corresponding to the desired pre-programmed control element functionality for the additional control element. The function selector switch can be any switch suitable for this purpose, i.e., a rotary switch, a slide switch or the like, for example. There is also the possibility of designing the function selector switch as a push-button, wherein the selection of the desired pre-programmed control element functionality is done via the number of push operations within a given time interval.

Typically, the pre-programmed control element functionalities of the function selection module are such functionalities which can also be actuated by the control elements arranged on the front side of the control console, in particular by the control elements actuated through push operation. As such, with this control console, depending on the number of additional control elements employed, one or even more functionalities of one or more front-side control elements can be allocated to the additional control element(s). Here, it can be provided that the functionality allocated to an additional control element is possible both by operating the additional control element and by operating the control element intended for this functionality on the front side. Alternatively, there is the possibility that, if a functionality of a control element arranged on the front side of the control console is allocated to an additional control element, this functionality can no longer be triggered or operated with the control element arranged on the front side. In another embodiment, it is provided that, if the functionality of a control element arranged on the front side of the control console has been assigned to such an additional control element, the control element present on the front side receives another functionality.

The configuration of the additional control element(s) can be carried out spontaneously by operating the function selector switch. To do so, it is not necessary to switch the control console into a programming mode. Thus, the assignment of the additional control element(s) in respect of this allocated functionality can also be done during an ongoing game or while the game is briefly paused. As such, configuration of the control console is possible to adjust it to the individual control needs of a user, and depending on the respective game, and also the course of the game.

The control element functionalities pre-programmed to the function selection module may also be at least one additional control element functionality which can be enabled as required and activated with such an additional control element. As a pre-programmed control element functionality, it can also be provided that, if the control functionality of a control element present on the front side of the control console is allocated to an additional control element, the control element arranged on the front side is then allocated a different functionality.

Typically, the function selection module also comprises a pre-programmed control element functionality as a dummy functionality, for which operation of the additional control element remains without function. This setting will be chosen if the additional control elements are not needed or are to remain without function when operated. In another embodiment, it is provided that the control console has a switch which can be used to switch the configuration of the additional control element(s) on or off.

In general, such a control console will be adapted to have at least two such additional control elements, so that each additional element has a function selection module and its own function selector switch allocated to it. Designing the control console with more than two additional control elements is also possible.

Typically, the number of manually selectable pre-programmed control element functionalities will be kept manageable to avoid incorrect settings.

In one embodiment of such a control console, the function selector switch(es) is/are designed as slide switch(es) as those will require relatively little installation space even with multiple switching positions and the current switching position can be felt easily with a finger.

According to one embodiment, the function selector switches are arranged on the rear side of the control console and there concealed by a cover when not in use. In this embodiment of the control console, the function selector switches will be configured in respect of an assignment of the additional control element(s) before starting the game. This cover is releasable or detachable from the control console to allow access to the function selector switch(es) if desired to be operated. If the assignment of the additional control element(s) is to be changed during the game, the cover may simply be taken off during the game even with such a design of the control console. In another embodiment, it is provided that the cover of the control console is not detachable from the control console but designed in the manner of a sliding blind. Then, there is no risk that a detached cover could be lost in the rush of the game.

If two additional control elements are provided on a control console with gripping shoulders, one of these additional control elements is located on each gripping shoulder, respectively, in the area of its rear side pointing towards the respective other gripping shoulder. In this position, such an additional control element can be reached and operated particularly well ergonomically, even if the additional control element is designed as a multi-position push-button, such as a switch rocker, for example.

In a further development of such a control console, it is provided that it has an interface to be able to import pre-programmed control element functionalities. These can replace existing pre-programmed control element functionalities or be saved as additional pre-programmed control element functionalities. If such an interface is provided, it is also possible to use the programming access via an external device to change the pre-programmed control element functionalities stored in the function selection module(s), which can be allocated to the additional control element(s). In this way, the pre-programmed control element functionalities can be configured on the user's side. Then, the selection of the control element functionality to be assigned to such an additional control element is done with the function selector switch allocated to an additional control element.

BRIEF DESCRIPTION OF THE DRAWINGS

The following descriptions are provided utilizing an example embodiment with reference to the accompanying figures, wherein.

DETAILED DESCRIPTION

Figure 1:
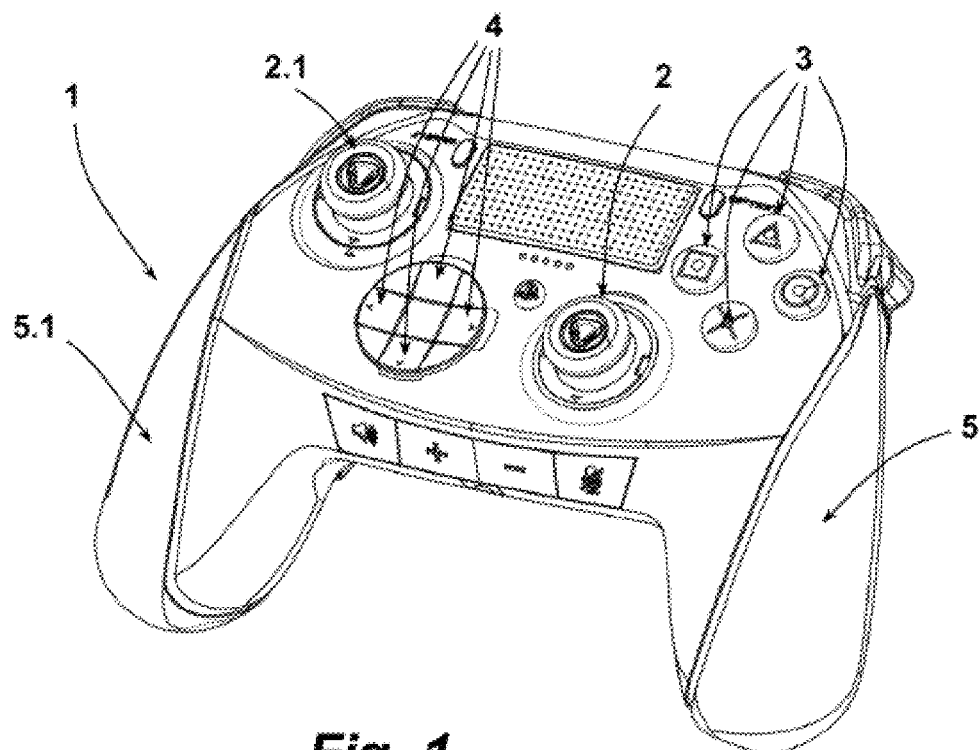
FIG. 1 shows a perspective view of a control console.
Figure 2:
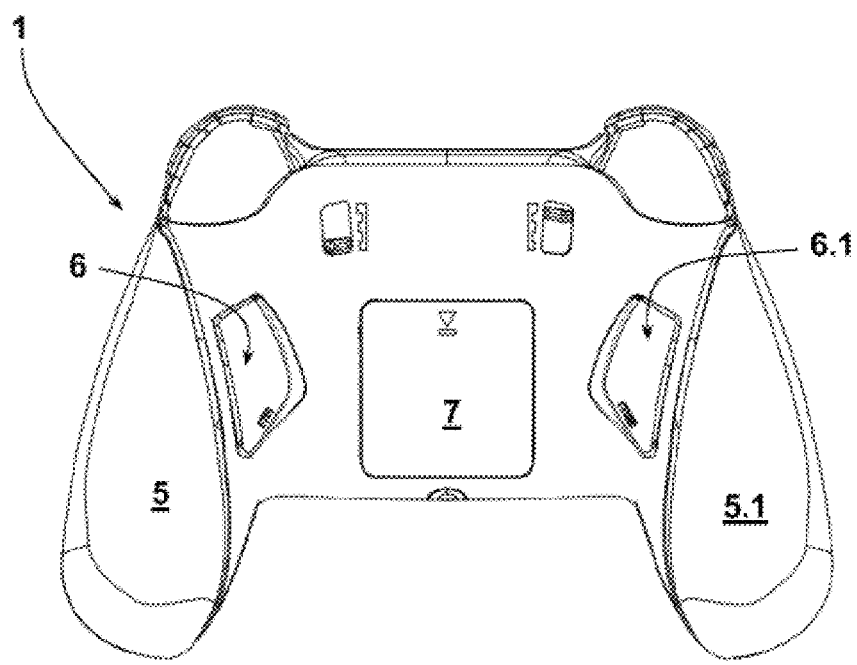
FIG. 2 shows a top view of the rear side of the control console of FIG. 1 with a cover in position.
Figure 3:
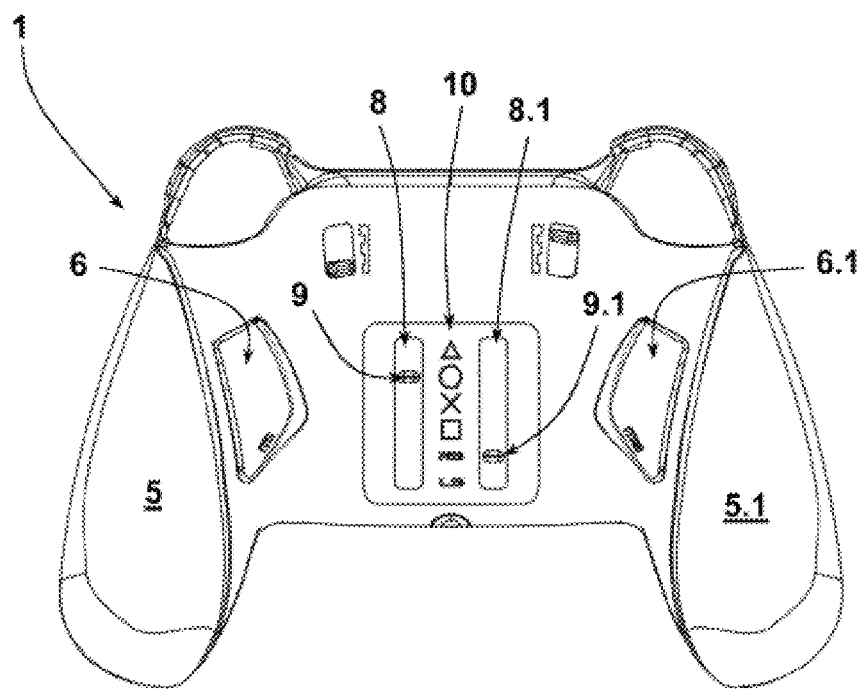
FIG. 3 shows the control console as shown in FIG. 2 with the cover removed.

A control console 1 holds multiple control elements on its front side. These include two joysticks 2.1 and multiple buttons (push-buttons) 3, 4. Control console 1 is shaped ergonomically and has two gripping shoulders 5, 5.1 which are sloped towards each other facing away from the side of use. The part of the housing of control console 1 connecting gripping shoulders 5, 5.1 carries aforementioned control elements 2, 2.1, 3, 4. On the rear side (bottom) of control console 1 shown in FIG. 2, there are two additional control elements 6, 6.1 designed as buttons. Additional control elements 6, 6.1 are located in a portion raised from the part of control console 1 connecting gripping shoulders 5, 5.1 such that additional control elements 6, 6.1 are arranged facing each other. This position is ergonomically favorable in that it can be reached with the middle finger, the ring finger or the little finger or even several of them and operated in the event a function is desired to be triggered. This requires neither removing the thumb from the joystick nor the index finger from the control elements operated by it. The functionality which can be performed with such an additional control element 6, 6.1 is configurable by the user. For this purpose, control console 1 has a function selection module 11 allocated to each additional control element 6 or 6.1, having multiple pre-programmed control element functionalities and having a manually operated function selector switch 8, 8.1. In the example embodiment shown, function selector switches 8, 8.1 are located underneath a cover 7 and are accessible upon detachment of cover 7. Cover 2 is guided in housing-side guide rails of control console 1 and removable from the guide rails to provide access to function selector switches 8, 8.1. FIG. 3 shows control console 1 with cover 7 detached, making function selector switch 8, 8.1 allocated to each additional control element 6 or 6.1 visible. In this example embodiment, function selector switches 8, 8.1 are designed as slide switches. Each function selector switch 8, 8.1 has a setting contour 9, 9.1 designed as a recess in the example embodiment shown. Of course, these may also be designed as a raised portion and thus as a cam. Setting contours 9, 9.1 are used for operating respective function selector switch 8, 8.1 and marking the current switching position. Both function selector switches 8, 8.1 are arranged at a distance from each other, wherein function selector switch 8 is closer to additional control element 6, whereas function selector switch 8.1 is arranged closer to additional control element 6.1. This also suggests the allocation of function selector switch 8, 8.1 in that function selector switch 8 is intended for configuring the functionality of additional control element 6 and function selector switch 8.1 for configuring the desired functionality of additional control element 6.1. Between the two function selector switches 8, 8.1, there is a switching position mark 10. Here, the geometric shapes represent those symbols used on buttons 3 on the front side of control console 1. Thus, each function selector switch 8, 8.1 can be assigned a functionality corresponding to the functionality of one of buttons 3. As shown for control console 1 in FIG. 3, function selector switch 8 is located in a position in which additional control element 6 is assigned the functionality of button 3 marked with a circle.

In total, this example embodiment provides six pre-programmed control element functionalities. In addition to the four control element functionalities allocated to buttons 3, function selector switches 8, 8.1 can be moved to two further functionalities "R3" or "L3". These are the push functionality of both joysticks 2, 2.1, wherein the push functionality (touch functionality) of joystick 2 corresponds to the "R3" functionality and the push functionality of joystick 2.1 corresponds to the "L3" functionality. Function selector switch 8.1 is located in the switching position in which additional control element 6.1 can perform the "R3" functionality.

Figure 4:
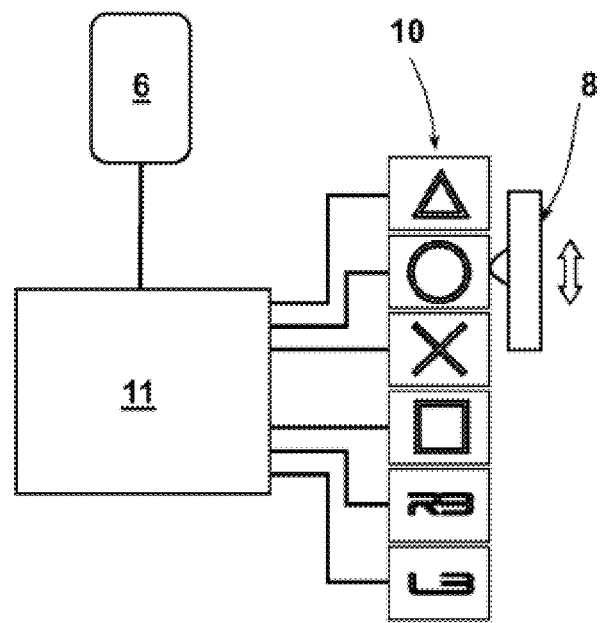
FIG. 4 shows a schematic block diagram to illustrate the function selection to assign an additional control element.

The configurability of additional control elements 6, 6.1 is shown schematically in FIG. 4. Each symbol of switching position mark 10 is allocated a switching position. Function selector switch 8 designed as a slide switch is located in its position also shown in FIG. 3 to select the control functionality of button 3 marked with the "circle" symbol on the front side of control console 1. This and also the other switching positions are typically identified haptically by a detent in the sliding motion of function selector switch 8. This detection of the switching position is connected to a function selection module 11 in which the six possible functionalities are stored as pre-programmed control element functionalities. According to the switching position selection performed with function selector switch 8, additional control element 6 is then assigned the selected functionality, i.e.: additional element 6 will trigger the allocated functionality when operated. Function selection module 11 can be an independent module or the controller, along with its program memory, anyway present in control console 1. It is also very well possible to use a common function selection module for the possibly multiple additional control elements.

The invention has been described by way of example embodiments. Without deviating from the scope of the applicable claims, a person skilled in the art would recognize numerous further ways of practicing the invention without them having to be described in detail in the context of these embodiments.

LIST OF REFERENCE NUMERALS

1 Control console
2, 2.1 Joystick
3 Button
4 Button
5, 5.1 Gripping shoulder
6, 6.1 Additional control element
7 Cover
8, 8.1 Function selector switch
9, 9.1 Setting contour
10 Switching position mark
11 Function selection module

The invention claimed is:

1. A control console having a front side and a rear side, with multiple manually operable control elements being arranged on the front side of the control console, the control console comprising:
   at least one additional control element which includes at least one user input mechanism that is physically operable by a user, whereby operation of the user input mechanism is configured to actuate an in-game functionality to be performed in game, and wherein the additional control element is configurable in respect of the in-game functionality that is actuated by operation of the user input mechanism of the additional control element, and
   function selection module having a manually operated function selector switch for selecting a pre-programmed control element functionality from multiple pre-programmed control element functionalities as the in-game functionality of the user input mechanism of the additional control element, wherein the function selector switch is physically movable into multiple switching positions,
   wherein, to configure the in-game functionality of the user input mechanism of the additional control element, the function selector switch is adapted to be brought into one of the multiple switching positions, with each switching position allocated a different pre-programmed control element functionality, and
   wherein at least some of the pre-programmed control element functionalities of the function selection module are in-game control functionalities actuated by operation of at least some of the control elements arranged on the front side of the control console.

2. The control console of claim 1, wherein one of the pre-programmed control element functionalities is a dummy functionality for which operation of the additional control element remains without function.

3. The control console of claim 1, wherein the function selector switch is designed as a slide switch.

4. The control console of claim 1, wherein the function selector switch is arranged on the rear side of the control console.

5. The control console of claim 1, wherein the function selector switch is located behind a cover openable to operate the function selector switch.

6. The control console of claim 5, wherein the cover is designed as a sliding cover guided in guide rails.

7. The control console of claim 6, wherein the sliding cover is adapted to be pushed out of the guide rails.

8. The control console of claim 1, wherein the at least one additional control element is a push-button.

9. The control console of claim 8, wherein the push-button is designed as a multi-position push-button.

10. The control console of claim 9, wherein the multi-position push-button is designed as a switch rocker.

11. The control console of claim 1, wherein the control console has multiple additional control elements, and each additional control element is allocated a function selection module having a function selector switch.

12. The control console of claim 11, wherein the multiple function selector switches are designed the same.

13. The control console of claim 11, wherein the control console has two gripping shoulders with rear sides which project from a part of the control console connecting the gripping shoulders on the rear side of the control console, and an additional control element is arranged on each gripping shoulder in an area of its rear side facing towards the respective other gripping shoulder.

14. The control console of claim 13, wherein the function selector switches are arranged at a distance from each other between the gripping shoulders such that each function selector switch is arranged closer to one of the two gripping shoulders than the other, respectively.

15. The control console of claim 1, wherein at least one of the control elements located on the front side of the control console is a joystick or a control element with a functionality corresponding to that of a joystick.

16. The control console of claim 1, wherein the control console comprises an interface for importing a control functionality from an external device as a pre-programmed control functionality, the imported control functionality being stored in a control functionality memory of the function selection module.

17. The control console of claim 1, wherein when an in-game control functionality of a control element arranged on the front side of the control console is assigned to the additional control element, said in-game control functionality is inoperable by said control element arranged on the front side of the control console.

18. The control console of claim 1, wherein when an in-game control functionality of a control element arranged on the front side of the control console is assigned to the additional control element, said control element arranged on the front side of the control console is assigned another in-game control functionality.

19. A method for programming a control console according to claim 1, comprising the steps of:
selecting and assigning pre-programmed control element functionalities of the function selection module to respective switch positions of the manually operated function selector switch, wherein at least some of the assigned control element functionalities are in-game control functionalities of one or more control elements arranged on the front side of the control console; and
selecting the in-game functionality to be performed in game by operation of the user input mechanism of the additional control element from the assigned control element functionalities by positioning the function selector switch into the switching position for the selected in-game functionality.

20. The method of claim 19, wherein when the selected in-game functionality of the additional control element is an in-game control functionality of a control element arranged on the front side of the control console: said in-game control functionality is inoperable by said control element arranged on the front side of the control console, or said control element arranged on the front side of the control console is assigned another in-game control functionality.

* * * * *